United States Patent
Matsumoto et al.

(10) Patent No.: US 12,051,931 B2
(45) Date of Patent: *Jul. 30, 2024

(54) ONBOARD POWER SUPPLY DEVICE AND ONBOARD POWER SUPPLY CONTROL METHOD

(71) Applicant: DENSO TEN Limited, Kobe (JP)

(72) Inventors: Takeshi Matsumoto, Kobe (JP); Hiroshi Matsumoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 422 days.

This patent is subject to a terminal disclaimer.

(21) Appl. No.: 17/462,666

(22) Filed: Aug. 31, 2021

(65) Prior Publication Data

US 2022/0302726 A1  Sep. 22, 2022

(30) Foreign Application Priority Data

Mar. 19, 2021 (JP) ................. 2021-045682

(51) Int. Cl.
*H02J 7/00* (2006.01)

(52) U.S. Cl.
CPC .......... *H02J 7/0068* (2013.01); *H02J 7/0031* (2013.01); *H02J 7/0036* (2013.01)

(58) Field of Classification Search
CPC .................................................. H02J 7/0068
USPC ....................................................... 320/137
See application file for complete search history.

(56) References Cited

U.S. PATENT DOCUMENTS

| 11,764,605 B2 * | 9/2023 | Kobayashi | H02H 7/20 |
| | | | 307/23 |
| 2017/0354017 A1 * | 12/2017 | Zhang | H05B 47/10 |
| 2018/0022300 A1 * | 1/2018 | Labbe | B60R 16/033 |
| | | | 307/10.1 |

FOREIGN PATENT DOCUMENTS

| JP | 2017-061240 A | 3/2017 |
| JP | 2017-184428 A | 10/2017 |
| JP | 2019-062727 A | 4/2019 |

\* cited by examiner

*Primary Examiner* — Yalkew Fantu
(74) *Attorney, Agent, or Firm* — Oliff PLC (57) ABSTRACT

An onboard power supply device includes: a first system; a second system; a first switch; a second switch; an abnormality detecting unit; and a switch setting unit configured to set a normal state, if occurrence of the power supply fault is not detected, and set a fail-safe state in which the first switch is in an OFF state, if occurrence of the power supply fault is detected, and after the first switch is set to the fail-safe state, with respect to each of the systems, the abnormality detecting unit detects whether any system power supply fault has occurred, and after the first switch is set to the fail-safe state, if occurrence of a system power supply fault is not detected from both of the systems, the switch setting unit sets each of the switches to the normal state.

4 Claims, 8 Drawing Sheets

ONBOARD POWER SUPPLY DEVICE AND ONBOARD POWER SUPPLY CONTROL METHOD

CROSS-REFERENCE TO RELATED APPLICATION

This application is based on and claims priority under 35 USC 119 from Japanese Patent Application No. 2021-045682 filed on Mar. 19, 2021.

TECHNICAL FIELD

Embodiments of this disclosure relate to an onboard power supply device and an onboard power supply control method.

BACKGROUND ART

Conventionally, there is a redundant power supply system which has a first power supply and a second power supply so as to supply electric power from one power supply to on-board equipment (loads) if a power supply fault occurs in a system for the other power supply, such that even if a power supply fault occurs when the vehicle is running, the redundant power supply system can make the vehicle run to a safe place for evacuation and stop there.

For example, the redundant power supply system has a first system for supplying electric power from a first power supply to a first load, and a second system for supplying electric power from a second power supply to a second load having the same function as the first load has. Further, if a power supply fault occurs in one system of the first system and the second system, the redundant power supply system performs fail-safe control by the other system (see Japanese Patent Application Laid-Open No. 2017-61240 for instance).

SUMMARY OF INVENTION

However, even when the redundant power supply system erroneously detects a sudden electric current increase or voltage drop attributable to an overload state as a power supply fault, the redundant power supply system proceeds to the fail-safe control. If a detected power supply fault is a detection error, it is desirable to return to the power supply state prior to the erroneous detection, and it is required to consider safety.

An aspect of embodiments was made in view of this circumstances, and an object thereof is to provide an onboard power supply device and an onboard power supply control method capable of safely returning to the power supply state prior to erroneous detection after a power supply fault is erroneously detected.

An onboard power supply device according to an aspect of embodiments includes a first system, a second system, a first switch, a second switch, an abnormality detecting unit, and a switch setting unit. The first system supplies electric power from a first power supply to a first load. The second system supplies electric power from a second power supply to a second load. The first switch connects the first system and the second system. The second switch connects the second power supply and the second load. The abnormality detecting unit detects occurrence of a power supply fault in one system of the first system and the second system. The switch setting unit sets a normal state in which the first switch is in the ON state and the second switch is in the OFF state, if occurrence of the power supply fault is not detected, and sets a fail-safe state in which the first switch is in the OFF state, if occurrence of the power supply fault is detected. After the first switch is set to the fail-safe state, with respect to each of the systems, the abnormality detecting unit detects whether any system power supply fault has occurred. After the first switch is set to the fail-safe state, if occurrence of a system power supply fault is not detected from both of the systems, the switch setting unit sets each of the switches to the normal state.

The onboard power supply device and the onboard power supply control method according to the aspect of the embodiments can safely return to the power supply state prior to erroneous detection after a power supply fault is erroneously detected.

DETAILED DESCRIPTION OF THE INVENTION

Hereinafter, embodiments of an onboard power supply device and an onboard power supply control method will be described in detail with reference to the accompanying drawings. However, the present invention is not limited by the following embodiments. Hereinafter, onboard power supply devices which are mounted on vehicles having a self-driving function to supply electric power to loads will be described as examples; however, the onboard power supply devices according to the embodiments can also be mounted on vehicles having no self-driving function.

Figure 1:
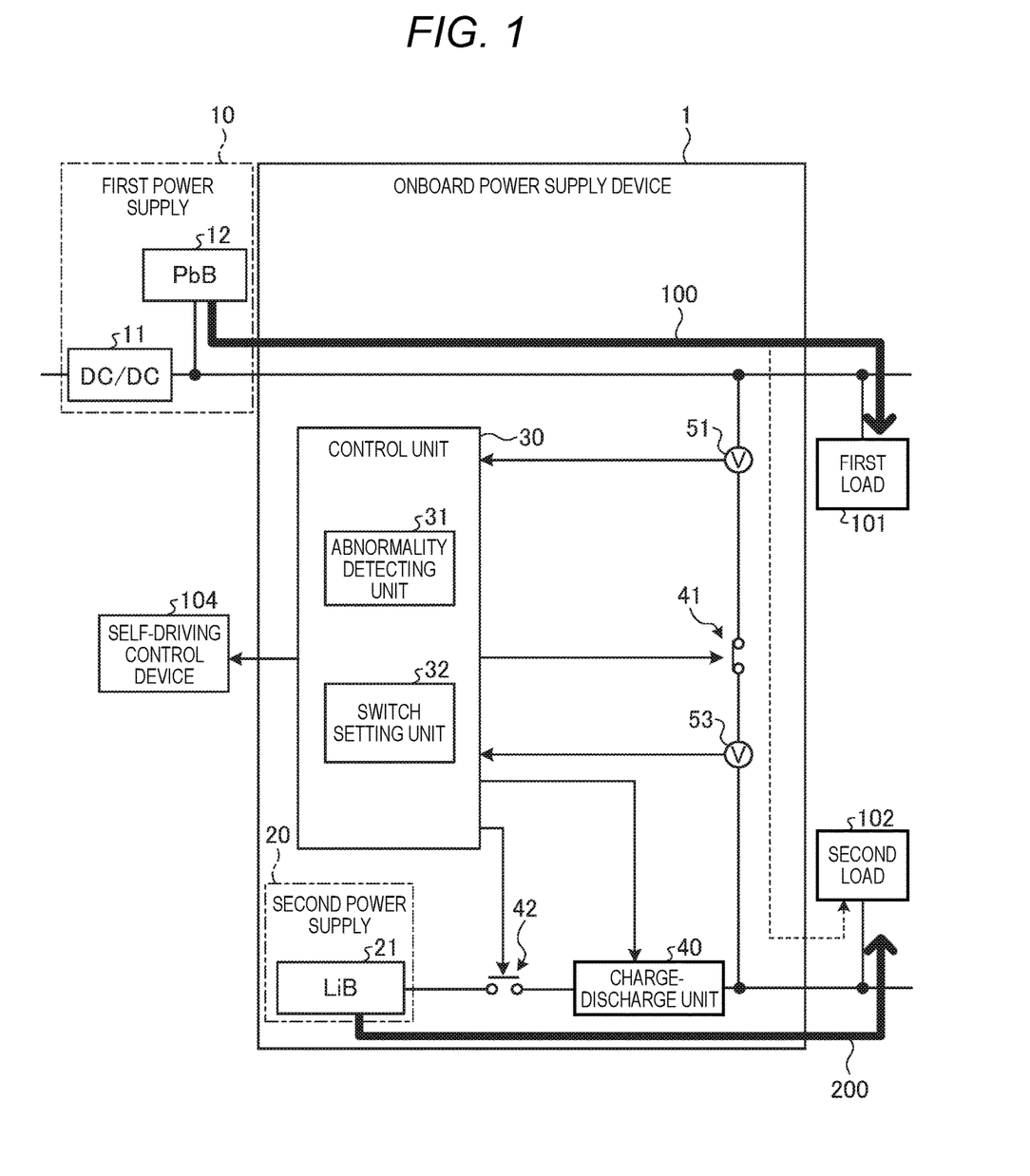
FIG. 1 is an explanatory view illustrating a configuration example of an onboard power supply device according to an embodiment.

FIG. 1 is an explanatory view illustrating a configuration example of an onboard power supply device 1 according to an embodiment. As shown in FIG. 1, the onboard power supply device 1 according to the embodiment is connected to a first load 101, a second load 102, and a self-driving control device 104.

The first load 101 includes a steering motor, an electric brake device, onboard cameras, radars, and so on which operate during self-driving. Also, the first load 101 includes general loads such as an air conditioner, an audio system, a video system, and various lights.

The second load 102 includes at least devices which operate during self-driving, such as a steering motor, an electric brake device, onboard cameras, and radars. The first load 101 and the second load 102 are operated by electric power which is supplied from the onboard power supply device 1.

The self-driving control device 104 is a control device for performing self-driving control on the vehicle by operating the first load 101 and the second load 102.

The onboard power supply device 1 gets electric power from a first power supply 10 provided outside. The onboard power supply device 1 supplies the electric power supplied from the first power supply 10 provided outside, to the first load 101 and the second load 102. The onboard power supply device 1 includes a second power supply 20, a control unit 30, a charge-discharge unit 40, a first switch 41, and a second switch 42. Further, the onboard power supply device 1 includes voltage sensors 51 and 53.

The first power supply 10 includes a DC-to-DC converter (hereinafter, referred to as the "DC/DC 11"), and a lead battery (hereinafter, referred to as the "PbB 12"). However, a battery for the first power supply 10 may be an arbitrary secondary battery other than the PbB 12.

The DC/DC 11 is connected to a power generator configured to generate electric power by converting the regenerative energy of the vehicle to electricity, and changes the input voltage applied from the power generator, and outputs it. In the case where the vehicle has an engine, the power generator may be an alternator configured to generate electric power by converting the torque of the engine to electricity. The DC/DC 11 performs charging the PbB 12, supply of electric power to the first load 101, supply of electric power to the second load 102, and charging the second power supply 20 (to be described below).

The first power supply 10 is connected to the first load 101 and the first switch 41. Between the first power supply 10 and the first switch 41, the voltage sensor 51 is connected.

The second power supply 20 includes, for example, a lithium-ion battery (hereinafter, referred to as the "LiB 21"). As the second power supply 20, a battery having a voltage higher than the voltage of the first power supply 10 is selected such that it is possible to supply the required minimum voltage even at low temperatures. The second power supply 20 is a backup power supply for the case where supply of electric power by the first power supply 10 becomes impossible.

The second power supply 20 is connected to the charge-discharge unit 40 through the second switch 42. In other words, the second switch 42 is connected so as to be able to connect and disconnect the second power supply 20 and the charge-discharge unit 40 to and from each other.

The charge-discharge unit 40 is, for example, a DC-to-DC converter. The charge-discharge unit 40 is connected to the first switch 41 and the second load 102. The charge-discharge unit 40 raises the voltage of the first power supply 10 to charge the second power supply 20, and goes into the stopped state if the charging is completed. Further, the charge-discharge unit 40 lowers the voltage of the second power supply 20, and supplies it to the second load 102.

The onboard power supply device 1 includes a first system 100 for supplying electric power from the first power supply 10 to the first load 101, and a second system 200 for supplying electric power from the second power supply 20 to the second load 102. The first switch 41 is connected so as to be able to connect and disconnect the first system 100 and the second system 200. The second switch 42 is connected so as to be able to connect and disconnect the second power supply 20 and the second load 102.

As described above, the onboard power supply device 1 includes the first system 100 and the second system 200. Therefore, if a power supply fault occurs in one system of the first system 100 and the second system 200, the onboard power supply device 1 supplies electric power by the other system, thereby capable of making the vehicle run to a safe place for evacuation and stop there. By the way, occurrence of power supply faults means that ground faults occur in the first system 100 or the second system 200. The same phenomena as power supply faults can occur even when the first load 101 or the second load 102 is overloaded.

The control unit 30 includes a microcomputer having a central processing unit (CPU), a read only memory (ROM), a random access memory (RAM), and so on, and various circuits. The control unit 30 includes an abnormality detecting unit 31 and a switch setting unit 32 which are operated by the CPU executing programs stored in the ROM using the RAM as a work area.

By the way, the abnormality detecting unit 31 and the switch setting unit 32 which are included in the control unit 30 may be partially or entirely configured with hardware such as an application specific integrated circuit (ASIC) and a field programmable gate array (FPGA).

The abnormality detecting unit 31 and the switch setting unit 32 which are included in the control unit 30 individually implement or perform information processing actions to be described below. By the way, the internal configuration of the control unit 30 is not limited to the configuration shown in FIG. 1, and may be any other configuration as long as the configuration can perform the following information processing.

The abnormality detecting unit 31 detects occurrence of a power supply fault in one system of the first system 100 and the second system 200. During the normal state in which the first switch 41 is in the ON state and the second switch 42 is in the OFF state, the abnormality detecting unit 31 determines whether the voltages detected by the voltage sensors 51 and 53 are within normal ranges. The normal ranges are ranges indicated by the voltages which can be detected by the voltage sensors 51 and 53 when there is no power supply fault in the first system 100 and the second system 200. For example, the normal ranges are ranges in which the voltages which can be detected by the voltage sensor 51 and 53 are equal to or higher than predetermined voltages.

During the normal state, if the voltage detected by the voltage sensor 51 or 53 is not within the normal range, for example, when the voltage is lower than the predetermined voltage, the abnormality detecting unit 31 detects that a power supply fault has occurred in one system of the first system 100 and the second system 200.

During the normal state, when the voltages detected by the voltage sensors 51 and 53 are within the normal ranges, the abnormality detecting unit 31 detects that any power supply fault has not occurred in the first system 100 and the second system 200.

If a power supply fault occurs in one system of the first system 100 and the second system 200, whereby the state of the first switch transitions to the fail-safe state, with respect to each of the systems, the abnormality detecting unit 31 detects whether a power supply fault (hereinafter, referred to as a "system power supply fault") has occurred. The fail-safe state is a state where the first switch 41 is in the OFF state.

Specifically, in a pre-cutoff state immediately after the first switch 41 has been turned off due to occurrence of a power supply fault in one system of the first system 100 and the second system 200, the abnormality detecting unit 31 detects whether any system power supply fault has occurred. The pre-cutoff state is a state which is a part of the fail-safe state and in which the first switch 41 is in the OFF state and the second switch 42 is in the ON state.

In the pre-cutoff state, the abnormality detecting unit 31 determines whether the voltage detected by the voltage sensor 51 is within the normal range. In the pre-cutoff state, if the voltage detected by the voltage sensor 51 is not within the normal range, for example, if the voltage detected by the voltage sensor 51 is lower than the predetermined voltage, the abnormality detecting unit 31 determines that a system power supply fault has occurred in the first system 100. The abnormality detecting unit 31 detects the occurrence of the system power supply fault (ground fault) in the first system 100.

In the pre-cutoff state, if the voltage detected by the voltage sensor 51 is within the normal range, for example, if the voltage detected by the voltage sensor 51 is equal to or higher than the predetermined voltage, the abnormality detecting unit 31 determines that any system power supply fault has not occurred in the first system 100. The abnormality detecting unit 31 detects that there is no system power supply fault (ground fault) in the first system 100.

In the pre-cutoff state, the abnormality detecting unit 31 determines whether the voltage detected by the voltage sensor 53 is within the normal range. In the pre-cutoff state, if the voltage detected by the voltage sensor 53 is not within the normal range, for example, if the voltage detected by the voltage sensor 53 is lower than the predetermined voltage, the abnormality detecting unit 31 determines that a system power supply fault has occurred in the second system 200. The abnormality detecting unit 31 detects the occurrence of the system power supply fault (ground fault) in the second system 200.

In the pre-cutoff state, if the voltage detected by the voltage sensor 53 is within the normal range, for example, if the voltage detected by the voltage sensor 53 is equal to or higher than the predetermined voltage, the abnormality detecting unit 31 determines that any system power supply fault has not occurred in the second system 200. The abnormality detecting unit 31 detects that there is no system power supply fault (ground fault) in the second system 200.

In the pre-cutoff state, if there is no system power supply fault in the first system 100 and the second system 200, the abnormality detecting unit 31 determines that returning from a power supply fault has been performed. In other words, the abnormality detecting unit 31 determines that the detection of the power supply fault is a detection error caused since the first load 101 or the second load 102 was overloaded The switch setting unit 32 sets the first switch 41 to the ON or OFF state. The switch setting unit 32 sets the second switch 42 to the ON or OFF state. If any power supply fault is not detected by the abnormality detecting unit 31, the switch setting unit 32 sets the state of each switch to the normal state by setting the first switch 41 to the ON state and setting the second switch 42 to the OFF state. In addition, during the normal state, if the state of charge (SOC) of the second power supply 20 becomes equal to or smaller than a predetermined amount, the switch setting unit 32 sets the second switch 42 to the ON state. As a result, the second power supply 20 is charged.

If a power supply fault is detected by the abnormality detecting unit 31, the switch setting unit 32 sets the state of the first switch 41 to the fail-safe state by setting the first switch 41 to the ON state. Further, after setting the state of the first switch 41 to the fail-safe state since the power supply fault was detected by the abnormality detecting unit 31, the switch setting unit 32 sets the state of each switch to the pre-cutoff state by setting the second switch 42 to the ON state.

In the pre-cutoff state, if occurrence of a system power supply fault in the first system 100 or the second system 200 is detected, the switch setting unit 32 sets the state of each switch to an original cutoff state. The original cutoff state is the state of each switch which is set if occurrence of a system power supply fault is detected in the fail-safe state and it is determined that the power supply fault is not a detection error.

Specifically, if occurrence of a system power supply fault in the first system 100 is detected, the switch setting unit 32 sets the state of each switch to a first original cutoff state by setting the first switch 41 to the OFF state and setting the second switch 42 to the ON state. As a result, electric power is supplied from the second power supply 20 to the second load 102 through the second system 200, and evaluation running control is performed by supplying electric power using the second system 200.

Further, if occurrence of a system power supply fault in the second system 200 is detected, the switch setting unit 32 sets the state of each switch to a second original cutoff state by setting the first switch 41 to the OFF state and setting the second switch 42 to the OFF state. As a result, electric power is supplied from the first power supply 10 to the first load 101 through the first system 100, and evaluation running control is performed by supplying electric power using the first system 100.

In the pre-cutoff state, if occurrence of a system power supply fault in the first system 100 is not detected, and occurrence of a system power supply fault in the second system 200 is not detected, the switch setting unit 32 sets the state of each switch to the normal state. In the pre-cutoff state, if occurrence of a system power supply fault is not detected from both systems, the switch setting unit 32 returns the state of each switch from the fail-safe state to the normal state by setting the first switch 41 to the ON state and then setting the second switch 42 to the OFF state. When returning to the normal state, the first switch 41 is set to the ON state, and then the second switch 42 is set to the OFF state. Therefore, it is possible to prevent instantaneous interruption of supply of electric power to the second load 102.

Now, operation examples of the onboard power supply device 1 will be described with reference to FIG. 2 to FIG. 7.

Figure 2:
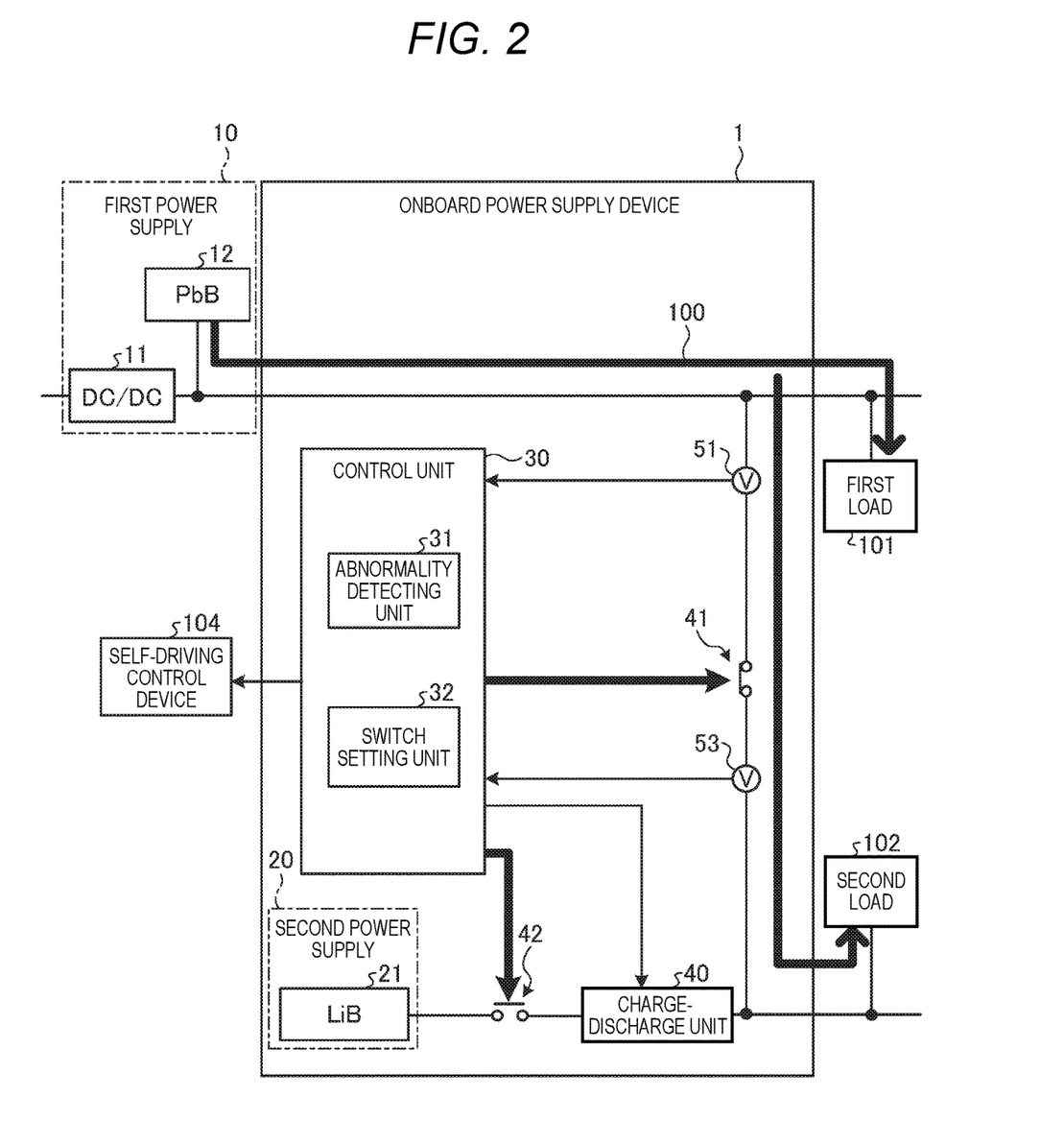
FIG. 2 is an explanatory view illustrating an operation example of the onboard power supply device according to the embodiment.

FIG. 2 to FIG. 7 are explanatory views illustrating the operation examples of the onboard power supply device 1 according to the embodiment. As shown in FIG. 2, if any power supply fault is not detected, the onboard power supply device 1 sets the state of each switch to the normal state by setting the first switch 41 to the ON state and setting the second switch 42 to the OFF state. As a result, electric power is supplied from the first power supply 10 to the first load 101 and the second load 102. For example, from each of the first load 101 and the second load 102, 50% of the maximum torque is output. In addition, from the second power supply 20 to the second load 102, electric power is not supplied.

If occurrence of a system power supply fault is detected from the first system 100 or the second system 200, the onboard power supply device 1 performs fail-safe control. The fail-safe control is control for restricting output and functions by the first load 101 or the second load 102 connected to the system having no system power supply fault, as compared to normal times when occurrence of any system power supply fault is not detected. For example, under the fail-safe control, 50% of the maximum torque is output. Therefore, even if a system power supply fault occurs in the first system 100 or the second system 200, the vehicle can run for evacuation.

In addition, if occurrence of a system power supply fault is detected during self-driving, the self-driving control device 104 performs the evaluation running control using the first load 101 or the second load 102 connected to the system having no system power supply fault, until the vehicle arrives at a safe place to stop, such as a shoulder. Thereafter, if the vehicle runs and stop for evacuation, the self-driving control device 104 prohibits the self-driving control. Therefore, it is possible to prevent accidents from being caused by self-driving when there is a system power supply fault.

Hereinafter, an operation example in the case where occurrence of a power supply fault is detected from the first system 100 or the second system 200 will be described.

Figure 3:
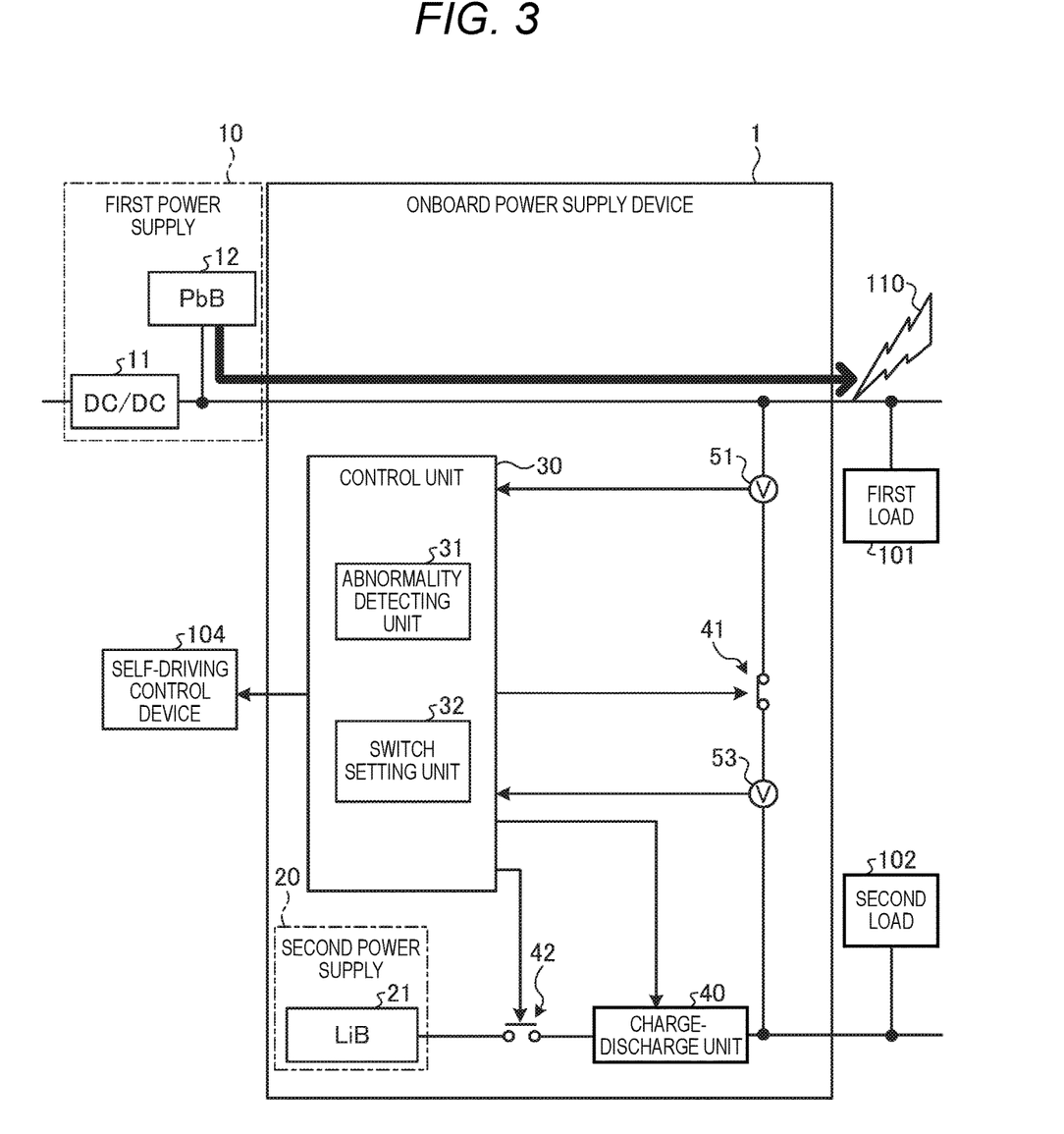
FIG. 3 is an explanatory view illustrating another operation example of the onboard power supply device according to the embodiment.

For example, in the onboard power supply device 1, as shown in FIG. 3, a ground fault 110 may occur in the first system 100. In the onboard power supply device 1, if a ground fault 110 occurs in the first system 100, overcurrent flows from the first power supply 10 to the ground fault point, whereby the voltages of the first system 100 and the second system 200 rapidly drop. As a result, the occurrence of the power supply fault is detected.

Figure 4:
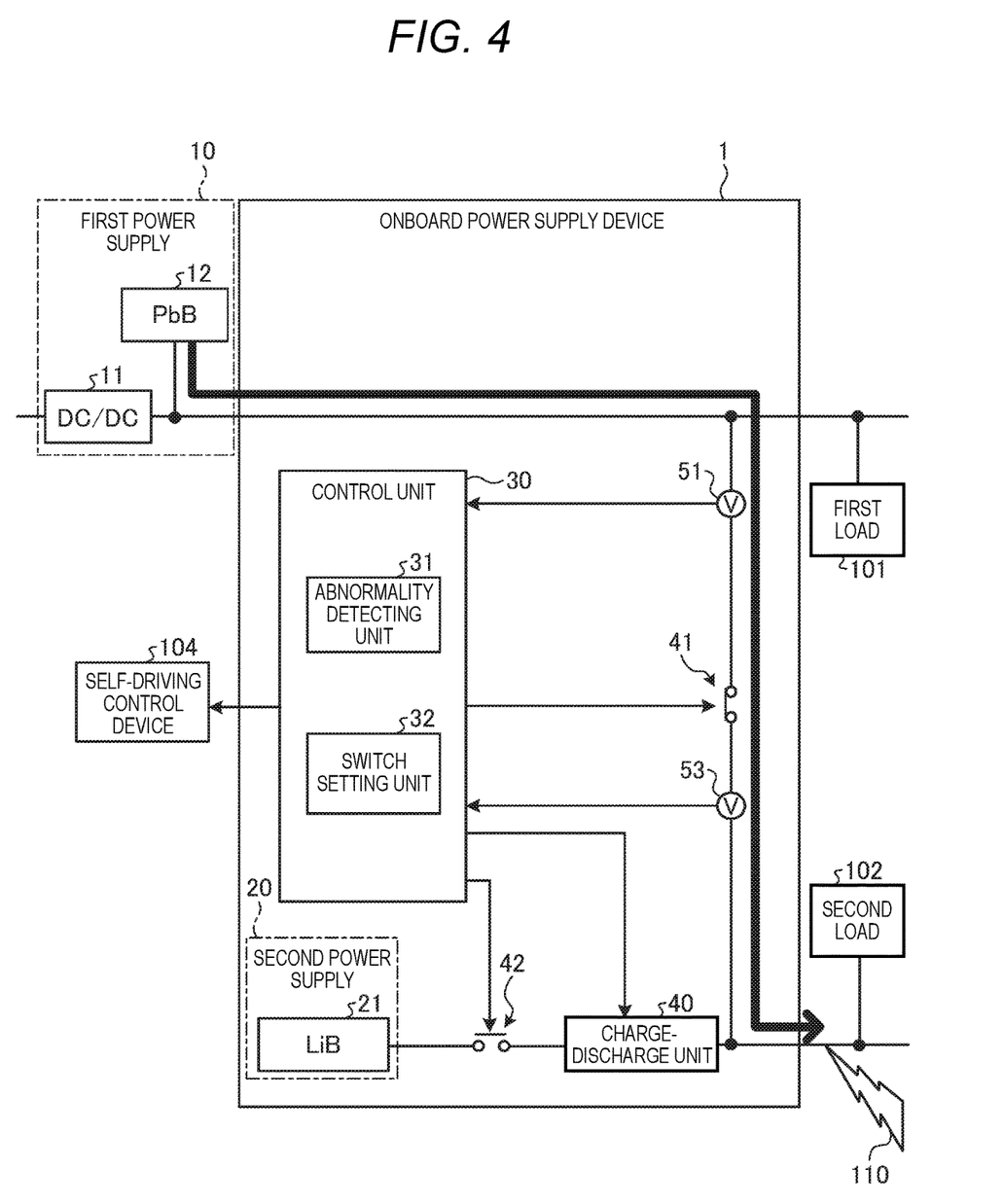
FIG. 4 is an explanatory view illustrating another operation example of the onboard power supply device according to the embodiment.

Also, in the onboard power supply device 1, as shown in FIG. 4, a ground fault 110 occurs in the second system 200. In the onboard power supply device 1, if a ground fault 110 occurs in the second system 200, overcurrent flows from the first power supply 10 to the ground fault point, whereby the voltages of the first system 100 and the second system 200 rapidly drop. As a result, the occurrence of the power supply fault is detected.

Figure 5:
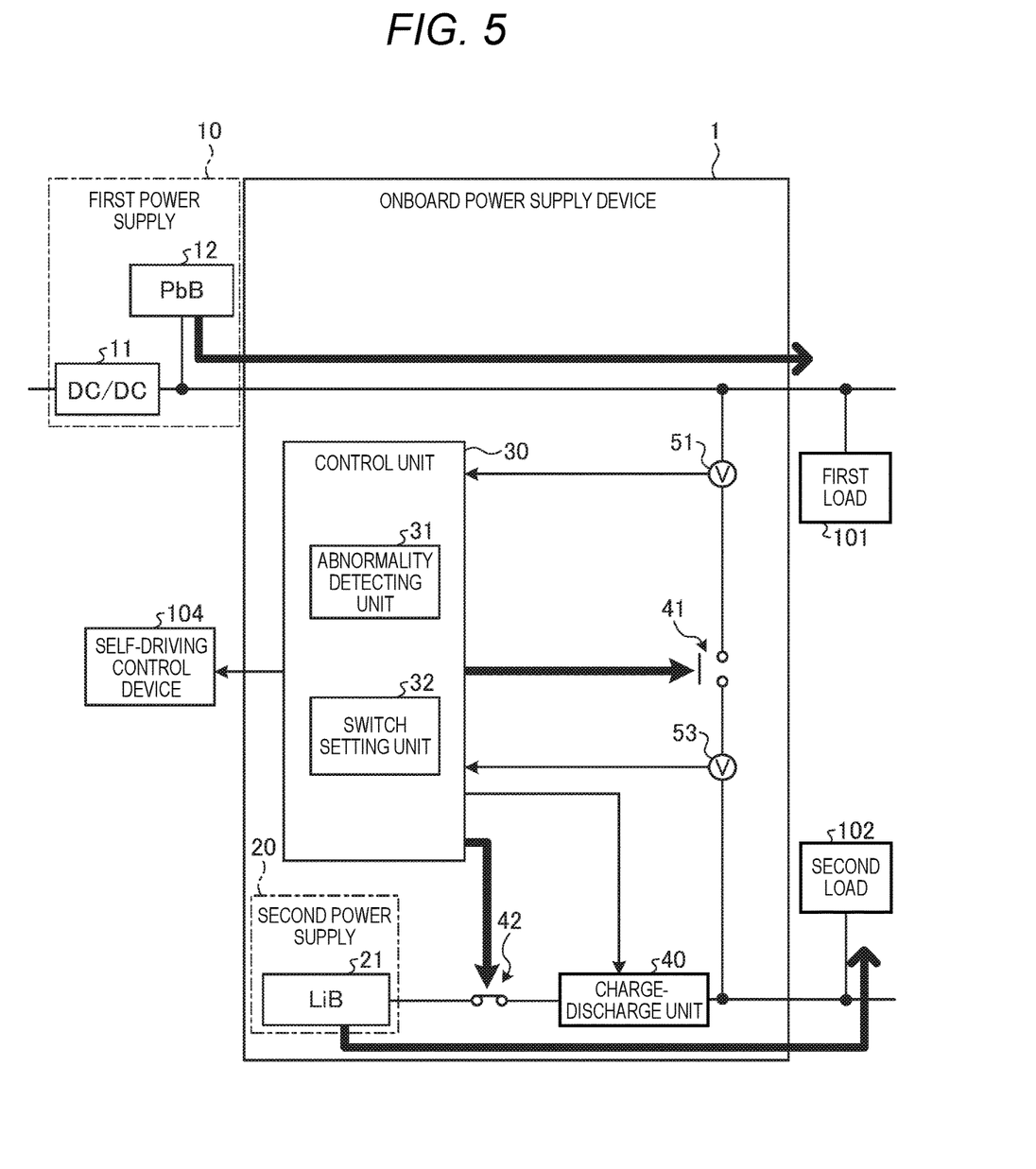
FIG. 5 is an explanatory view illustrating another operation example of the onboard power supply device according to the embodiment.

Also, in the onboard power supply device 1, even when the first load 101 or the second load 102 is overloaded, the voltages of the first system 100 and the second system 200 may drop rapidly. For this reason, in the onboard power supply device 1, even when the first load 101 or the second load 102 is overloaded, occurrence of a power supply fault is detected. If occurrence of a power supply fault is detected in the first system 100 or the second system 200, the onboard power supply device 1 sets the first switch 41 to the fail-safe state by setting the first switch 41 to the OFF state, as shown in FIG. 5. Also, the onboard power supply device 1 sets the second switch 42 to the ON state, thereby setting the state of each switch to the pre-cutoff state. As a result, by the second system 200, electric power is supplied from the second power supply 20 to the second load 102.

Figure 6:
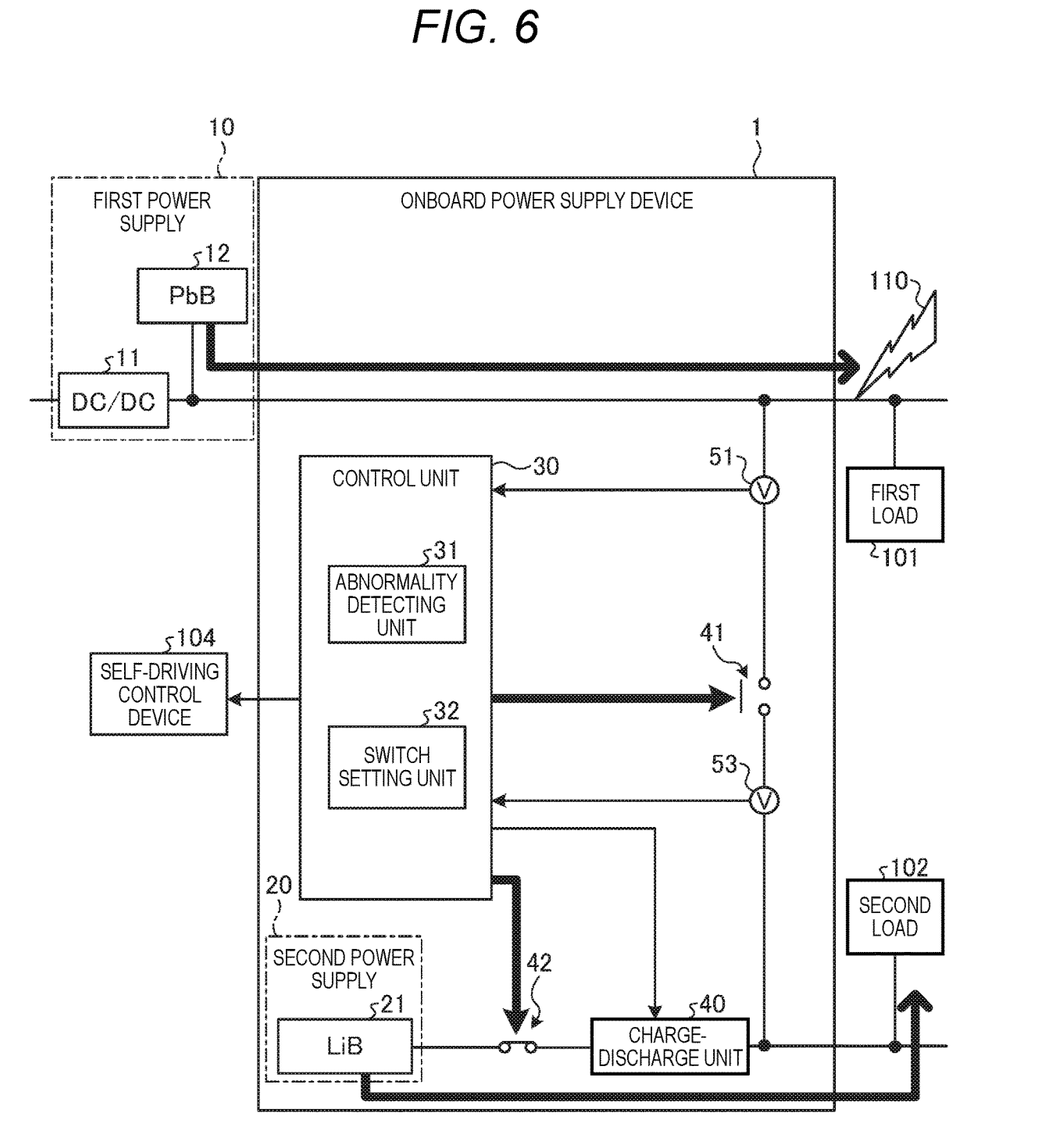
FIG. 6 is an explanatory view illustrating another operation example of the onboard power supply device according to the embodiment.

In the pre-cutoff state, the onboard power supply device 1 detects the voltage of the first system 100 by the voltage sensor 51. If the detected voltage is not within the normal range, the onboard power supply device 1 determines that a system power supply fault (a ground fault 110) has occurred in the first system 100, and detects the occurrence of the system power supply fault in the first system 100. Then, the onboard power supply device 1 sets the state of each switch to the first original cutoff state by setting the first switch 41 to the OFF state and setting the second switch 42 to the ON state, as shown in FIG. 6. As a result, electric power is supplied from the second power supply 20 to the second load 102 through the second system 200, and the fail-safe control using the second load 102 is performed.

Figure 7:
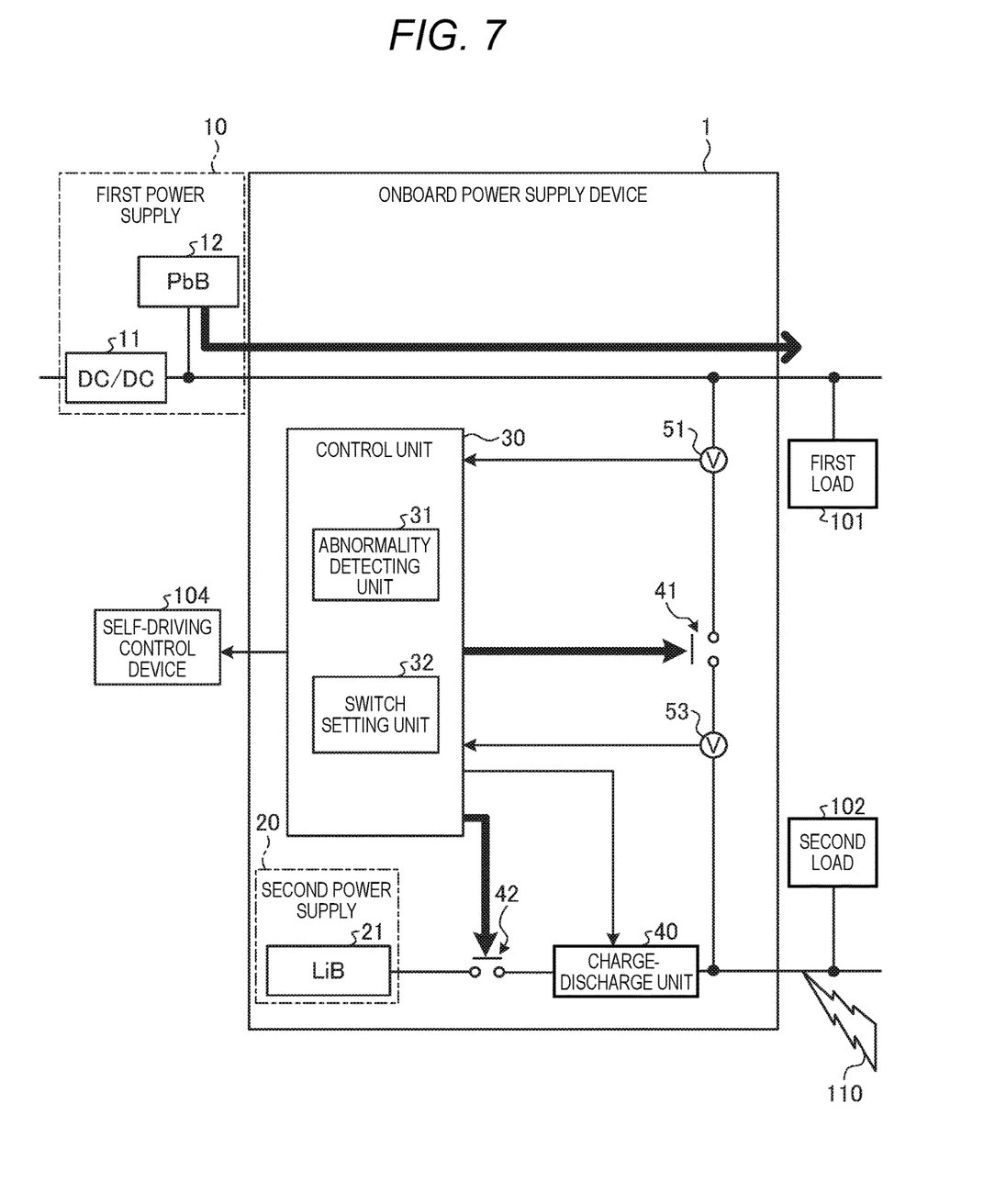
FIG. 7 is an explanatory view illustrating another operation example of the onboard power supply device according to the embodiment.

In the pre-cutoff state, the onboard power supply device 1 detects the voltage of the second system 200 by the voltage sensor 53. If the detected voltage is not within the normal range, the onboard power supply device 1 determines that a system power supply fault (a ground fault 110) has occurred in the second system 200, and detects the occurrence of the system power supply fault in the second system 200. Then, the onboard power supply device 1 sets the first switch 41 to the OFF state and sets the second switch 42 to the OFF state, as shown in FIG. 7. As a result, supply of electric power from the second power supply 20 stops, and electric power is supplied from the first power supply 10 to the first load 101 through the first system 100, and the fail-safe control using the first load 101 is performed.

In the pre-cutoff state, if determining that there is no system power supply fault in the first system 100 and the second system 200, the onboard power supply device 1 determines that the power supply fault is a detection error. The onboard power supply device 1 determines that the power supply fault was detected since the first load 101 or the second load 102 was overloaded, resulting in a temporal drop in the voltage. The onboard power supply device 1 returns the state of each switch from the pre-cutoff state to the normal state shown in FIG. 2 by setting the first switch 41 to the ON state and then setting the second switch 42 to the OFF state. When returning to the normal state, the onboard power supply device sets the first switch 41 to the ON state, and then sets the second switch 42 to the OFF state. Therefore, it is possible to prevent instantaneous interruption of supply of electric power to the second load 102.

Figure 8:
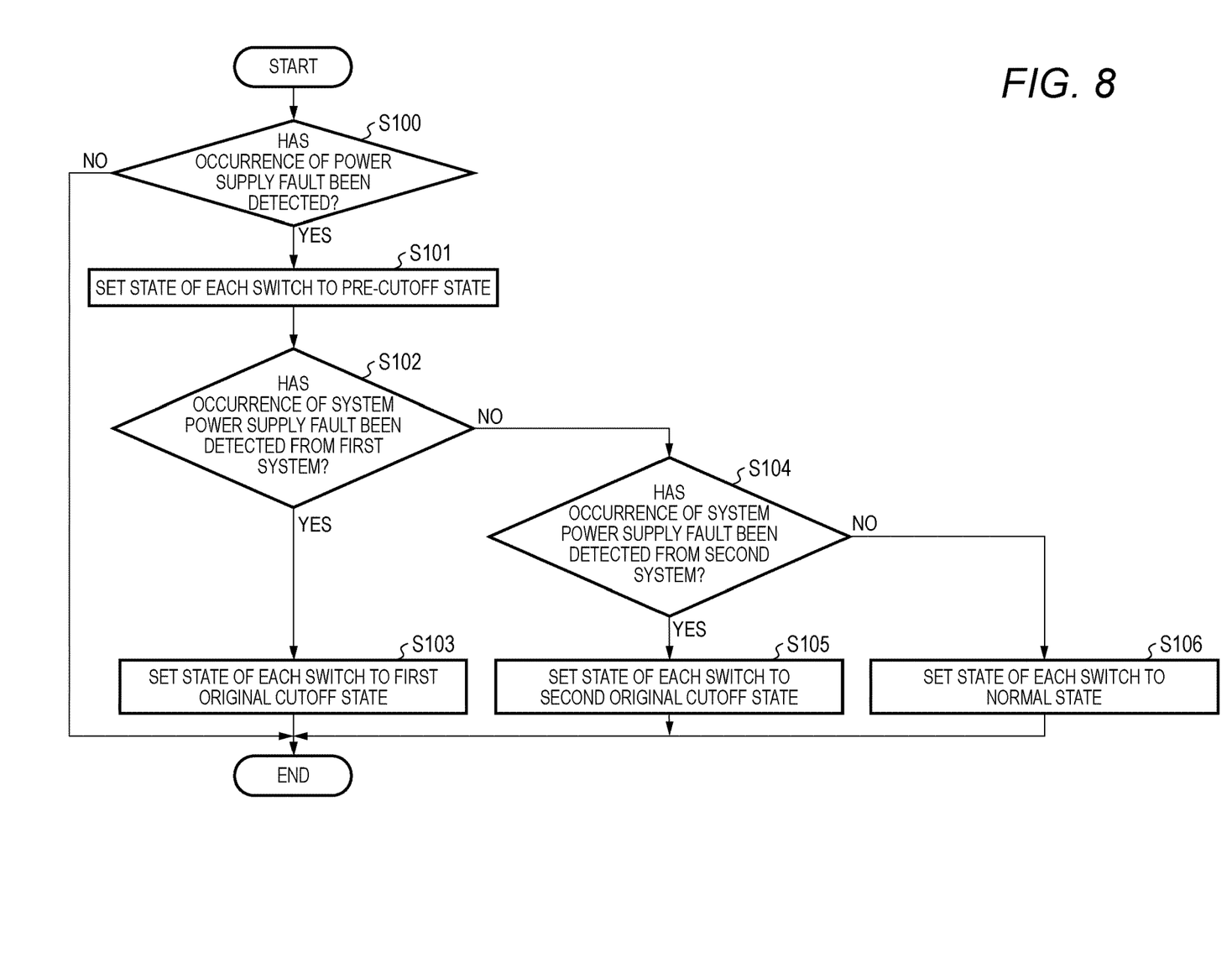
FIG. 8 is a flow chart for explaining a switch switching process according to the embodiment.

Now, a switch switching process according to the embodiment will be described with reference to FIG. 8. FIG. 8 is a flow chart for explaining the switch switching process according to the embodiment.

The onboard power supply device 1 determines whether occurrence of a power supply fault has been detected from the first system 100 or the second system 200 (STEP S100). If occurrence of a power supply fault has not been detected from the first system 100 and the second system 200 ("No" in STEP S100), the onboard power supply device 1 ends this process.

If occurrence of a power supply fault has been detected from the first system 100 or the second system 200 ("Yes" in STEP S100), the onboard power supply device 1 sets the state of each switch to the pre-cutoff state (STEP S101). Specifically, the onboard power supply device 1 sets the state of the first switch 41 to the fail-safe state by setting the first switch 41 to the OFF state, and sets the state of the second switch 42 to the ON state, thereby setting the state of each switch to the pre-cutoff state.

The onboard power supply device 1 determines whether occurrence of a system power supply fault has been detected from the first system 100 (STEP S102). If occurrence of a system power supply fault has been detected from the first system 100, and a ground fault has occurred in the first system 100 ("Yes" in STEP S102), the onboard power supply device 1 sets the state of each switch to the first original cutoff state (STEP S103). Specifically, the onboard power supply device 1 sets the first switch 41 to the OFF state, and sets the second switch 42 to the ON state.

If occurrence of a system power supply fault has not been detected from the first system 100 ("No" in STEP S102), the onboard power supply device 1 determines whether occurrence of a system power supply fault has been detected from the second system 200 (STEP S104).

If occurrence of a system power supply fault has been detected from the second system 200, and a ground fault has occurred in the second system 200 ("Yes" in STEP S104), the onboard power supply device 1 sets the state of each switch to the second original cutoff state (STEP S105). Specifically, the onboard power supply device 1 sets the first switch 41 to the OFF state, and sets the second switch 42 to the OFF state.

If occurrence of a system power supply fault has not been detected from the second system 200 ("No" in STEP S104), i.e. if occurrence of a system power supply fault has not been detected from the first system 100 and the second system 200, the onboard power supply device 1 sets the state of each switch to the normal state (STEP S106). Specifically, the onboard power supply device 1 sets the first switch 41 to the ON state, and sets the second switch 42 to the OFF state.

By the way, the processing order of the process of determining whether a system power supply fault has occurred in the first system 100 (STEP S102) and the process of determining whether a system power supply fault has occurred in the second system 200 (STEP S104) can be reversed.

The onboard power supply device 1 according to the embodiment includes the first system 100, the second system 200, the first switch 41, the second switch 42, the abnormality detecting unit 31, and the switch setting unit 32. The first system 100 supplies electric power from the first power supply 10 to the first load 101. The second system 200 supplies electric power from the second power supply 20 to the second load 102. The first switch 41 connects the first system 100 and the second system 200. The second switch 42 connects the second power supply 20 and the second load 102. The abnormality detecting unit 31 detects occurrence of a power supply fault in one system of the first system 100 and the second system 200. The switch setting unit 32 sets the normal state in which the first switch 41 is in the ON state and the second switch 42 is in the OFF state, if occurrence of a power supply fault is not detected, and sets the fail-safe state in which the first switch 41 is in the OFF state, if occurrence of a power supply fault is detected. After the first switch 41 is set to the fail-safe state, with respect to each of the systems, the abnormality detecting unit 31 determines whether any system power supply fault has occurred. After the first switch 41 is set to the fail-safe state, if occurrence of a system power supply fault has not been detected from both systems, the switch setting unit 32 sets each switch to the normal state.

Therefore, after occurrence of a power supply fault is detected, if any system power supply fault is not detected from both systems, each switch returns to the normal state. In other words, after confirming that any system power supply fault has not occurred in both systems, the onboard power supply device 1 returns each switch to the normal state. Therefore, it is possible to improve the safety when returning each switch to the normal state. Further, for example, if a detected power supply fault is due to the overload state of the first load 101 or the second load 102, and is an erroneously detected power supply fault, the onboard power supply device 1 returns each switch to the normal state. Therefore, even if a power supply fault is erroneously detected, the onboard power supply device 1 can make the vehicle normally run without restricting the running function.

The switch setting unit 32 sets the second switch 42 to the ON state in the fail-safe state. After the first switch 41 is set to the fail-safe state, if the voltage of the first system 100 is not within the normal range, the abnormality detecting unit 31 detects occurrence of a system power supply fault in the first system 100. After the first switch 41 is set to the fail-safe state, and the second switch 42 is set to the ON state, if the voltage of the second system 200 is not within the normal range, the abnormality detecting unit 31 detects occurrence of a system power supply fault in the second system 200.

In this way, the onboard power supply device 1 can detect occurrence of a system power supply fault in each system. Therefore, the onboard power supply device 1 can accurately detect occurrence of a system power supply fault in each system.

After the first switch 41 is set to the fail-safe state, if the voltage of the first system 100 is within the normal range, the abnormality detecting unit 31 does not detect occurrence of a system power supply fault in the first system 100. After the first switch 41 is set to the fail-safe state and the second switch 42 is set to the ON state, if the voltage of the second system 200 is within the normal range, the abnormality detecting unit 31 does not detect occurrence of a system power supply fault in the second system 200.

In this way, the onboard power supply device 1 can detect that any system power supply fault has not occurred in each system. Therefore, the onboard power supply device 1 can improve the safety when returning each switch to the normal state.

An onboard power supply device 1 according to a modification may determine that there is a system power supply fault in the first system 100, if the voltage which is detected by the voltage sensor 51 is out of the normal range for a predetermined time, in the fail-safe state. The onboard power supply device 1 according to the modification may determine that there is no system power supply fault in the first system 100, if the voltage which is detected by the voltage sensor 51 is within the normal range for the predetermined time, in the pre-cutoff state.

Also, the onboard power supply device 1 according to the modification may determine that there is a system power supply fault in the second system 200, if the voltage which is detected by the voltage sensor 53 is within the normal range for the predetermined time, in the pre-cutoff state. Also, the onboard power supply device 1 according to the modification may determine that there is no system power supply fault in the second system 200, if the voltage which is detected by the voltage sensor 53 is within the normal range for the predetermined time, in the pre-cutoff state.

The predetermined time is a time set in advance, and is a time required to accurately determine whether there is any system power supply fault in each system. A predetermined time may be set for each system.

The onboard power supply device 1 according to the modification counts the time for which the voltage which is detected by the voltage sensor 51 or 53 is within the normal range, or the time for which the voltage which is detected by the voltage sensor 51 or 53 is out of the normal range. If the voltage changes beyond the predetermined voltage before the counted time reach the predetermined time, the onboard power supply device 1 according to the modification resets the counted time. In this way, the onboard power supply device 1 according to the modification can accurately detects whether there is any system power supply fault in each system.

An onboard power supply device 1 according to another modification may detect electric currents flowing in the individual systems by current sensors, and detect whether any power supply fault or any system power supply fault has occurred, on the basis of the detected electric currents. If a ground fault occurs, the electric current which is detected by the corresponding current sensor increases rapidly. If an electric current detected by a current sensor is equal to or higher than a predetermined electric current set in advance, the onboard power supply device 1 according to another modification detects occurrence of a power supply fault or a system power supply fault.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

DESCRIPTION OF REFERENCE NUMERALS

1 ONBOARD POWER SUPPLY DEVICE
10 FIRST POWER SUPPLY
20 SECOND POWER SUPPLY
30 CONTROL UNIT
31 ABNORMALITY DETECTING UNIT
32 SWITCH SETTING UNIT
41 FIRST SWITCH
42 SECOND SWITCH
51, 53 VOLTAGE SENSOR
100 FIRST SYSTEM
200 SECOND SYSTEM
101 FIRST LOAD
102 SECOND LOAD

What is claimed is:

1. An onboard power supply device comprising:
a first system configured to supply electric power from a first power supply to a first load;
a second system configured to supply electric power from a second power supply to a second load;
a first switch configured to connect the first system and the second system;
a second switch configured to connect the second power supply and the second load;
an abnormality detecting unit configured to detect occurrence of a power supply fault in one system of the first system and the second system; and
a switch setting unit configured to set a normal state in which the first switch is in an ON state and the second switch is in an OFF state, if occurrence of the power supply fault is not detected, and set a fail-safe state in which the first switch is in an OFF state, if occurrence of the power supply fault is detected,
wherein after the first switch is set to the fail-safe state, with respect to each of the systems, the abnormality detecting unit detects whether any system power supply fault has occurred, and
after the first switch is set to the fail-safe state, if occurrence of the system power supply fault is not detected from both of the systems, the switch setting unit sets each of the switches to the normal state.

2. The onboard power supply device according to claim 1, wherein
in the fail-safe state, the switch setting unit sets the second switch to an ON state, and
after the first switch is set to the fail-safe state, when a voltage or an electric current of the first system is out of a normal range, the abnormality detecting unit detects occurrence of the system power supply fault in the first system, and
after the first switch is set to the fail-safe state, and the second switch is set to the ON state, when a voltage or an electric current of the second system is out of a normal range, the abnormality detecting unit detects occurrence of the system power supply fault in the second system.

3. The onboard power supply device according to claim 2, wherein
after the first switch is set to the fail-safe state, when the voltage or the electric current of the first system is within the normal range, the abnormality detecting unit does not detect occurrence of the system power supply fault in the first system, and
after the first switch is set to the fail-safe state, and the second switch is set to the ON state, when the voltage or the electric current of the second system is within the normal range, the abnormality detecting unit does not detect occurrence of the system power supply fault in the second system.

4. An onboard power supply control method comprising:
an abnormality detecting process of detecting occurrence of a power supply fault in one system of a first system configured to supply electric power from a first power supply to a first load and a second system configured to supply electric power from a second power supply to a second load; and
a switch setting process of setting a normal state in which a first switch configured to connect the first system and the second system is in an ON state and a second switch configured to connect the second power supply and the second load is in an OFF state, if occurrence of the power supply fault is not detected, and setting a fail-safe state in which the first switch is in an OFF state, if occurrence of the power supply fault is detected,
wherein after the first switch is set to the fail-safe state, with respect to each of the systems, the abnormality detecting process detects whether any system power supply fault has occurred, and
after the first switch is set to the fail-safe state, if occurrence of the system power supply fault is not detected from both of the systems, the switch setting process sets each of the switches to the normal state.

* * * * *